United States Patent
Lee et al.

(10) Patent No.: US 10,452,180 B2
(45) Date of Patent: Oct. 22, 2019

(54) DRIVING CIRCUIT AND SENSING UNIT THEREOF

(71) Applicant: LG Display Co., Ltd., Seoul (KR)

(72) Inventors: SungYub Lee, Paju-si (KR); HongChul Kim, Paju-si (KR); YoungJoon Lee, Paju-si (KR); Seongkyu Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 107 days.

(21) Appl. No.: 15/707,714

(22) Filed: Sep. 18, 2017

(65) Prior Publication Data

US 2018/0088715 A1  Mar. 29, 2018

(30) Foreign Application Priority Data

Sep. 23, 2016 (KR) .......................... 10-2016-0122336

(51) Int. Cl.
  *G06F 3/045* (2006.01)
  *G06F 3/041* (2006.01)
  *G02F 1/1333* (2006.01)
  *G02F 1/1343* (2006.01)
  *G06F 3/044* (2006.01)

(52) U.S. Cl.
  CPC .......... *G06F 3/0412* (2013.01); *G02F 1/1343* (2013.01); *G02F 1/13338* (2013.01); *G06F 3/044* (2013.01); *G06F 3/0416* (2013.01)

(58) Field of Classification Search
  CPC ...... G06F 3/0416; G06F 3/0412; G06F 3/041; G06F 3/044
  See application file for complete search history.

(56) References Cited

U.S. PATENT DOCUMENTS

| | | | | |
|---|---|---|---|---|
| 6,985,275 B2* | 1/2006 | Miyazawa | .......... | H01L 51/5262 313/503 |
| 9,019,196 B2* | 4/2015 | Doi | .......... | G06F 3/044 345/104 |
| 9,459,274 B2* | 10/2016 | Shaeffer | .......... | G01C 19/5776 |
| 9,619,083 B1* | 4/2017 | Kang | .......... | G06F 3/0412 |
| 9,813,823 B2* | 11/2017 | Suenaga | .......... | H01L 41/0471 |

(Continued)

OTHER PUBLICATIONS

Laminate Film, Electronic Element, Printed Circuit Board, and Display Device; JP 2015-254441; Motoyumi Taguchi ; Dec. 25, 2015; pp. 1-59. (Year: 2015).*

*Primary Examiner* — Vijay Shankar
(74) *Attorney, Agent, or Firm* — Fenwick & West LLP

(57) ABSTRACT

Provided is a driving circuit included in a touch display device, which is capable of performing display driving, touch sensing, and additional sensing in addition to the touch sensing. The driving circuit includes a common electrode driving controller, a pixel electrode driving controller, and a sending unit. The common electrode driving controller is configured to apply a common voltage to a common electrode during a display-driving period. The pixel electrode driving controller is configured to apply a data voltage to a pixel electrode during the display-driving period. The sensing unit is connected to the common electrode driving controller during a first sensing period and to the pixel electrode driving controller during a second sensing period. The sensing unit is configured to sense a change in capacitance between the common electrode or pixel electrode and an object that is in contact with the display panel.

12 Claims, 12 Drawing Sheets

(56) References Cited

U.S. PATENT DOCUMENTS

| | | | |
|---|---|---|---|
| 10,025,970 B2* | 7/2018 | Mizuhashi | G06F 3/044 |
| 10,146,987 B2* | 12/2018 | Mizuhashi | G06F 3/044 |
| 10,151,944 B2* | 12/2018 | Taguchi | H05K 3/284 |
| 2014/0260619 A1* | 9/2014 | Shaeffer | G01C 19/5776 |
| | | | 73/528 |
| 2017/0188469 A1* | 6/2017 | Taguchi | B32B 7/12 |

* cited by examiner

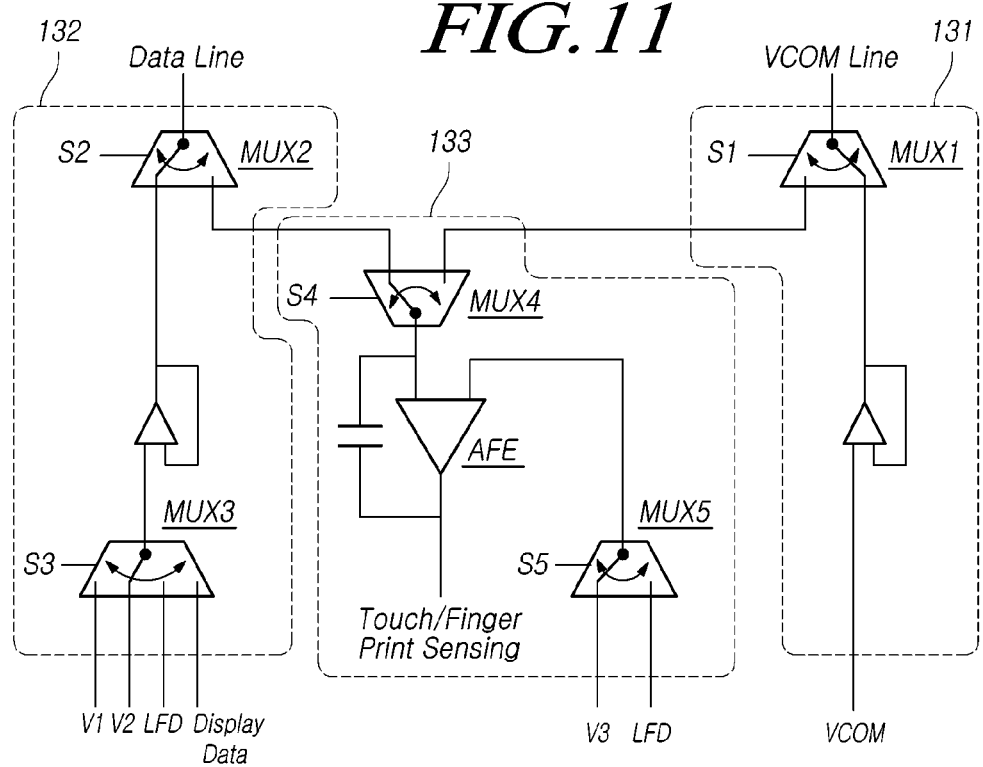
FIG.11
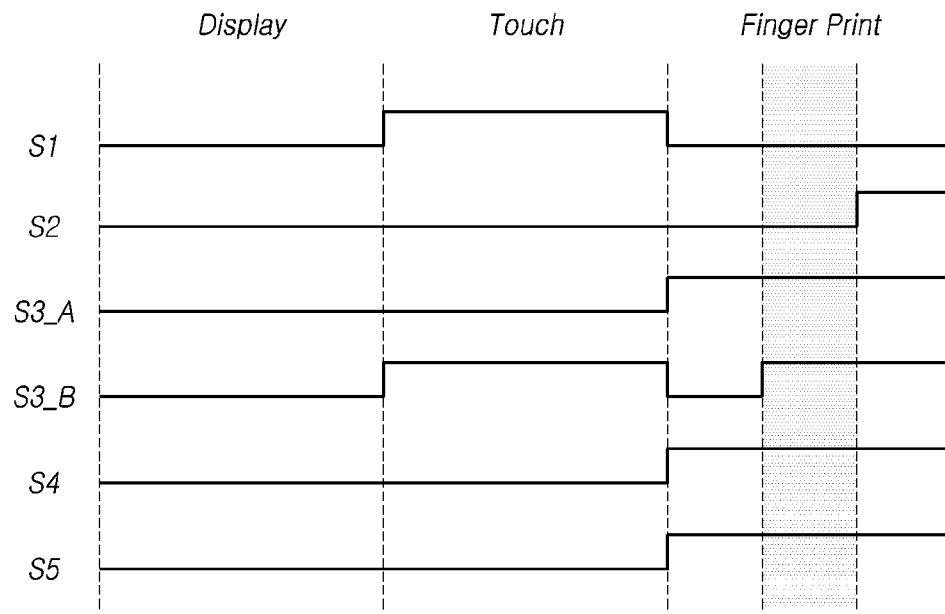

DRIVING CIRCUIT AND SENSING UNIT THEREOF

CROSS REFERENCE TO RELATED APPLICATION

This application claims priority from Korean Patent Application No. 10-2016-0122336, filed on Sep. 23, 2016, which is hereby incorporated by reference for all purposes as if fully set forth herein.

BACKGROUND

1. Field of the Invention

The present invention relates to a driving circuit included in a touch display device and a sensing unit included in the driving circuit.

2. Description of the Prior Art

The display devices capable of performing touch-type input processing have been developed to provide a greater number and variety of functions, and users' demands have also diversified.

Due to various demands associated with touch-type input processing, a scheme of sensing a fingerprint of a user who touches a display panel and using the same for input processing is applied, in addition to determining whether a user touches a display panel and sensing the location of a touch.

As described above, a separate driving circuit is used for sensing a touch or the like so as to provide a function of sensing a touch or a fingerprint touch on the display panel, in addition to displaying an image through the display panel.

As various sensing functions, such as touch sensing, fingerprint touch sensing, or the like are added to meet the demands of users, the number of driving circuits required for performing the sensing function is also increased, which is a drawback. Therefore, there is a need for a driving circuit that is embodied to perform touch sensing, fingerprint touch sensing, and the like together.

SUMMARY

An aspect of the present embodiments is to provide a driving circuit, which is capable of driving a display of a display panel and performing at least two types of sensing functions with respect to the display panel.

Another aspect of the present embodiments is to provide a driving circuit, which is capable of performing display driving and touch sensing, and is also capable of performing an added sensing function and improving the accuracy of the added sensing function.

In accordance with an aspect of the present disclosure, there is provided a touch display device, which is capable of sensing a user touch using a common electrode disposed inside a display panel and is capable of performing sensing, beyond simply sensing a user touch, using a pixel electrode disposed inside the display panel.

For example, sensing in addition to sensing a user touch may sense a user fingerprint touch.

The touch display device may include a driving circuit, which can perform: display driving that displays an image through the display panel; touch sensing that senses a user touch using a common electrode; and fingerprint touch sensing that senses a user fingerprint touch using a pixel electrode.

The driving circuit may include: a common electrode driving controller, which is connected with a common electrode disposed inside a display panel through a common voltage line and is configured to apply a common voltage to the common electrode in a display-driving period; a pixel electrode driving controller, which is connected with a pixel electrode disposed inside the display panel through a data line and is configured to apply a data voltage to the pixel electrode in the display-driving period; and a sensing unit, which is connected with the common electrode driving controller in a first sensing period and with the pixel electrode driving controller in a second sensing period and is configured to sense a change in capacitance between the common electrode or pixel electrode and an object that is in contact with the display panel.

Here, the first sensing period is a period for sensing a user touch, and the second sensing period is a period for performing additional sensing in addition to a user touch, such as fingerprint recognition, a photo sensor, and the like.

The driving circuit may perform display driving or sensing in separate time intervals by dividing time into display driving period, the first sensing period, and the second sensing period.

The common electrode driving controller included in the driving circuit may include a first multiplexer, an output end of which is connected with the common voltage line and an input end of which is connected with a common voltage-output end in the display-driving period and the second sensing period, and which is connected with the sensing unit in the first sensing period.

The pixel electrode driving controller included in the driving circuit may include: a second multiplexer, of which an output end is connected with the data line; and a third multiplexer, of which an output end is connected with the second multiplexer.

An input end of the second multiplexer is connected with the third multiplexer in the display-driving period and the first sensing period, and is connected with the sensing unit in the second sensing period, and an input end of the third multiplexer is connected with a data-voltage-output end in the display-driving period, and is connected with a load-free driving voltage-output end in the first sensing period.

The sensing unit included in the driving circuit may include a fourth multiplexer, and an input end of the fourth multiplexer is connected with the first multiplexer in the first sensing period and is connected with the second multiplexer in the second sensing period.

Alternatively, an input end of the second multiplexer is connected with the third multiplexer in the display-driving period and the first sensing period, is connected with the third multiplexer in a first interval and a second interval of the second sensing period, and is connected with the sensing unit in a third interval of the second sensing period.

In this instance, an input end of the third multiplexer is connected with a data-voltage-output end in the display-driving period, is connected with a load-free driving voltage-output end in the first sensing period, is connected with a first-voltage-output end in the first interval of the second sensing period, and is connected with a second-voltage-output end in the second interval of the second sensing period.

The sensing unit may include: a fourth multiplexer, of which an output end is connected with a (−) end of an operational amplifier; and a fifth multiplexer, of which an output end is connected with a (+) end of the operational amplifier, wherein an input end of the fourth multiplexer is connected with the first multiplexer in the first sensing period and is connected with the second multiplexer in the third interval of the second sensing period, and an input end of the fifth multiplexer is connected with the load-free driving voltage-output end in the first sensing period and is connected with a third voltage-output end in the second sensing period.

Here, a first voltage is applied in the state in which a switching transistor that connects the data line and the pixel electrode is turned on, and a second voltage is applied in the state in which the switching transistor is turned off. The second voltage applied in the second interval of the second sensing period is the same voltage as the third voltage.

In accordance with another aspect of the present disclosure, there is provided a sensing unit of a driving circuit, including: an operational amplifier; a sensing control multiplexer, of which an output end is connected with a (−) end of the operational amplifier and of which an input end is connected with a common voltage line, which is connected with a common electrode, in a first sensing period and is connected with a data line, which is connected with a pixel electrode, in some intervals of a second sensing period; and a voltage control multiplexer of which an output end is connected with a (+) end of the operational amplifier, and of which an input end is connected with a load-free driving voltage-output end in the first sensing period and is connected with a reference voltage-output end in the second sensing period.

According to embodiments of the present disclosure, a driving circuit can perform display driving, touch sensing, and additional sensing, in addition to touch sensing, through a display panel of a touch display device.

According to embodiments of the present disclosure, a driving circuit can perform display driving and at least two types of sensing, whereby a touch display device's functions of displaying an image and sensing a user touch or the like may be implemented through a single driving circuit.

BRIEF DESCRIPTION OF THE DRAWINGS

The above and other objects, features, and advantages of the present disclosure will be more apparent from the following detailed description taken in conjunction with the accompanying drawings, in which:

FIGS. 8 to 12 are diagrams illustrating the driving scheme of a driving circuit according to the second embodiment.

DETAILED DESCRIPTION

Figure 1:
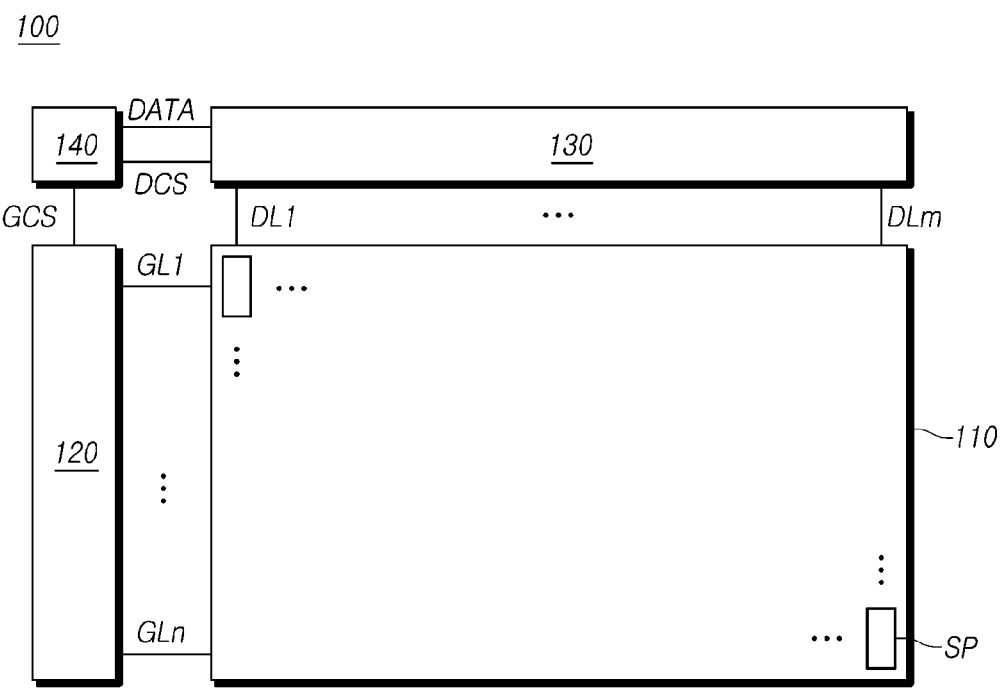
FIG. 1 is a diagram schematically illustrating a configuration for performing display driving in a touch display device according to embodiments of the present disclosure.

Hereinafter, some embodiments of the present disclosure will be described in detail with reference to the accompanying illustrative drawings. In designating elements of the drawings by reference numerals, same elements will be designated by the same reference numerals although they are shown in different drawings. Furthermore, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram schematically illustrating a configuration for performing display driving in a touch display device 100 according to one embodiments.

Referring to FIG. 1, the touch display device 100 according to various embodiments of the present disclosure includes: a display panel 110 in which a plurality of gate lines (GL) and a plurality of data lines (DL) are disposed, and in which a plurality of sub-pixels (or pixels) is disposed on intersections at which the gate lines (GL) and the data lines (DL) intersect; a gate driver 120 which drives the plurality of gate lines (GL); a data driver 130 which supplies data voltage to the plurality of data lines (DL); and a controller 140 which controls driving of the gate driver 120 and the data driver 130.

The gate driver 120 sequentially provides a scan signal (gate signal) to the plurality of gate lines (GL), thereby sequentially driving the plurality of gate lines (GL).

The gate driver 120 sequentially supplies a gate signal of on-voltage or off-voltage to the plurality of gate lines (GL) under the control of the controller 140, and sequentially drives the plurality of gate lines (GL).

The gate driver 120 may be located on one side of the display panel 110, or may be located on both sides, depending on the driving scheme.

Also, the gate driver 120 may include one or more gate driver integrated circuits.

Each gate driver integrated circuit may be connected with a bonding pad of the display panel 110 based on a Tape-Automated-Bonding (TAB) scheme or a Chip-On-Glass (COG) scheme, or may be embodied as a Gate-In-Panel (GIP) type and may be directly disposed on the display panel 110.

In some embodiments, the gate driver integrated circuit may be disposed by being integrated with the display panel 110, or may be embodied as a Chip On Film (COF) scheme so that the gate driver integrated circuit is mounted on a film connected with the display panel 110.

The data driver 130 drives the plurality of data lines (DL) by supplying data voltage to the plurality of data lines (DL).

When a predetermined gate line (GL) is open, the data driver 130 converts image data received from the controller 140 into data voltage of an analog type, supplies the converted voltage to a plurality of data lines (DL), and drives the plurality of data lines (DL).

The data driver 130 may include at least one source driver integrated circuit, and may drive the plurality of data lines (DL).

Each source driver integrated circuit may be connected with a bonding pad of the display panel 110 based on a Tape Automated Bonding (TAB) scheme or a Chip On Glass (COG) scheme, may be directly disposed on the display panel 110, or may be disposed in a manner of being integrated with the display panel 110.

Also, each source driver integrated circuit may be embodied based on a Chip-On-Film (COF) scheme. In this instance, one end of each source driver integrated circuit may be bonded to at least one source printed circuit board, and the other end may be bonded to the display panel 110.

The controller 140 supplies various types of control signals to the gate driver 120 and the data driver 130 to control the gate driver 120 and the data driver 130.

The controller 140 starts scanning according to the timing implemented in each frame, switches input image data received from the outside to be appropriate for the data signal format used in the data driver 130, outputs the switched image data, and controls data driving at a suitable time based on the scan.

The controller 140 receives, from the outside (e.g., a host system), various timing signals including a vertical synchronization signal (Vsync), a horizontal synchronization signal (Hsync), an input Data Enable (DE) signal, a clock signal (CLK), and the like, as well as the input image data.

In addition to converting input image data received from the outside to make the input image data appropriate for the data signal format used by the data driver 130 and outputting the converted image data, the controller 140 may receive a timing signal, such as a vertical synchronization signal (Vsync), a horizontal synchronization signal (Hsync), an input data enable signal (DE), a clock signal (CLK), and the like, may generate various control signals, and may output the same to the gate driver 120 and the data driver 130, so as to control the gate driver 120 and the data driver 130.

For example, in order to control the gate driver 120, the controller 140 outputs various Gate Control Signals (GCSs) including a Gate Start Pulse (GSP), a Gate Shift Clock (GSC), a Gate Output Enable (GOE) signal, and the like.

Here, the GSP controls the operation start timing of one or more gate driver integrated circuits included in the gate driver 120. The GSC is a clock signal which is input to one or more gate driver integrated circuits, and may control the shift timing of a gate signal. The GOE signal designates timing information of one or more gate driver integrated circuits.

Furthermore, in order to control the data driver 130, the controller 140 outputs various Data Control Signals (DCSs) including a Source Start Pulse (SSP), a Source Sampling Clock (SSC), a Source Output Enable (SOE) signal, and the like.

The SSP controls a data sampling start timing of one or more source driver integrated circuits included in the data driver 130. The SSC is a clock signal that controls a sampling timing of data in each source driver integrated circuit. The SOE controls the output timing of the data driver 130.

The controller 140 may be disposed on a control printed circuit board, which is connected with a source printed circuit board to which a source driver integrated circuit is bonded, through a connection medium such as a flexible flat cable (FFC) or a flexible printed circuit (FPC).

In the control printed circuit board, a power controller (not illustrated) may be further disposed, which supplies various voltages or currents to the display panel 110, the gate driver 120, the data driver 130, and the like, or controls various voltages or currents to be supplied. The power controller is also referred to as a power management IC.

The touch display device 100 may provide a function of sensing a user touch or the like on the display panel 110, in addition to a function of displaying an image, and may provide at least two types of sensing functions.

Figure 2:
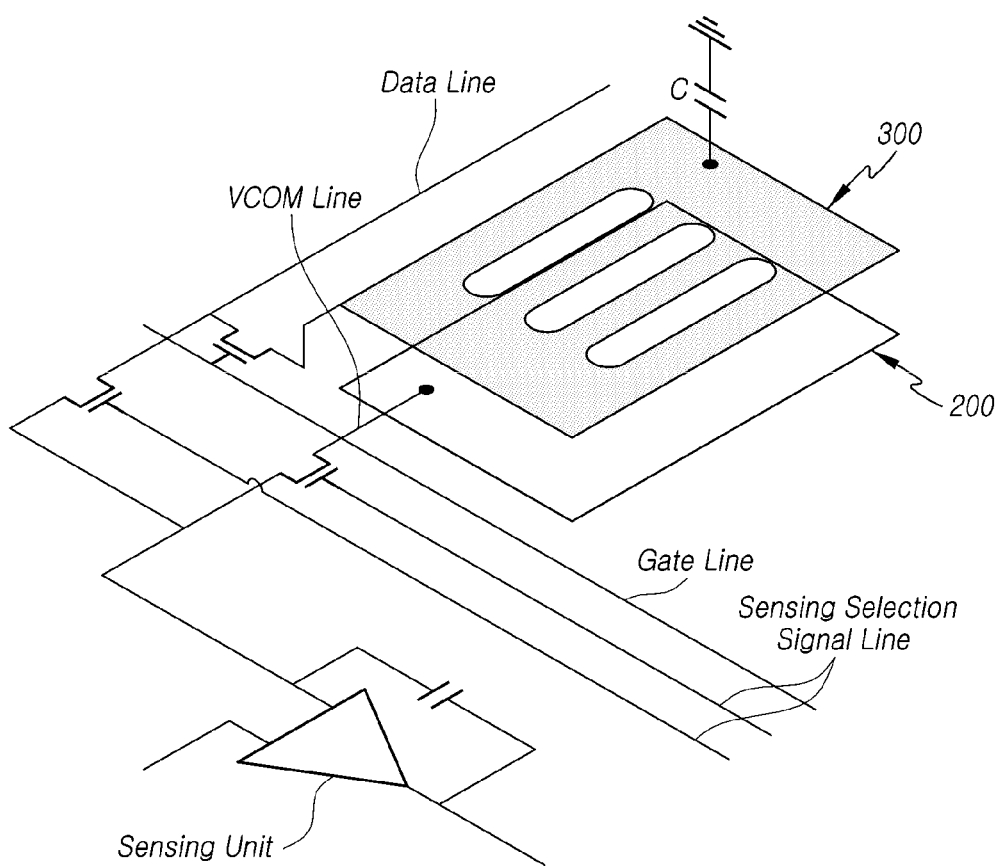
FIG. 2 is a diagram illustrating a scheme of performing at least two types of sensing by a touch display device according to one embodiment.

FIG. 2 is a diagram illustrating a scheme of sensing a user touch or the like by the touch display device 100 according to one embodiment.

Referring to FIG. 2, the touch display device 100 may provide a sensing function with respect to the display panel 110 using a common electrode 200 and a pixel electrode 300, which are disposed inside the display panel 110.

For example, the touch display device 100 may sense a user touch on the display panel 110 using the common electrode 200 disposed inside the display panel 110.

The touch display device 100 applies a common voltage to the common electrode 200 in a display-driving period so as to perform display driving, and applies a touch driving signal to the common electrode 200 in a touch-sensing period (hereinafter, referred to as a "first sensing period") so as to sense a user touch.

When a touch driving signal is applied to the common electrode 200 in the touch-sensing period and a user touch is made on the display panel 110, a change in the capacitance between a finger of the user and the common electrode 200 is sensed, whereby whether a user touch is made and the location of the touch (coordinates) may be sensed.

The touch display device 100 may provide an additional sensing function using the pixel electrode 300, in addition to sensing a user touch using the common electrode 200.

For example, the touch display device 100 may sense a user fingerprint touch using the pixel electrode 300.

To sense a fingerprint touch on the display panel 110, a process of sensing differences in the capacitance between peaks and valleys of a fingerprint and separating peaks and valleys may be used. Accordingly, sensing a fingerprint touch is performed using the pixel electrode 300, which is smaller than the common electrode 200.

The touch display device 100 applies data voltage to the pixel electrode 300 in the display-driving period so as to perform display driving, and applies a fingerprint-touch-sensing driving signal to the pixel electrode 300 in a fingerprint-touch-sensing period (hereinafter, referred to as a "second sensing period") so as to sense a user fingerprint touch.

The touch display device 100 applies the fingerprint-touch-sensing driving signal through a data line (DL) in the fingerprint-touch-sensing period, and separates peaks and valleys using a change in the capacitance of the pixel electrode 300, which occurs when a user fingerprint touch is made, and differences in the capacitance between peaks and valleys of a fingerprint.

The touch display device 100 may need a driving circuit for sensing a change in the capacitance of the common electrode 200 or the pixel electrode 300, in order to provide various sensing functions in addition to the display-driving function.

The embodiments of the present disclosure provide the structure of a driving circuit which implements a display-driving function and various sensing functions of the touch display device 100 using a single driving circuit.

Figure 3:
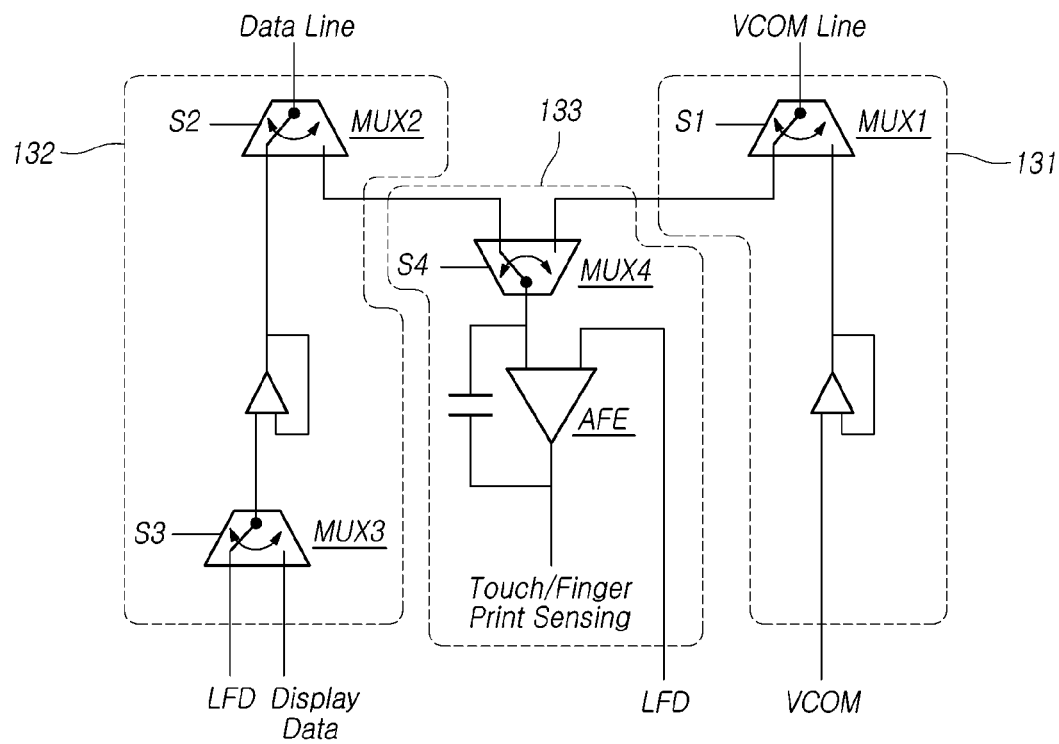
FIG. 3 is a diagram illustrating the structure of a driving circuit according to a first embodiment included in a touch display device.
Figure 3:
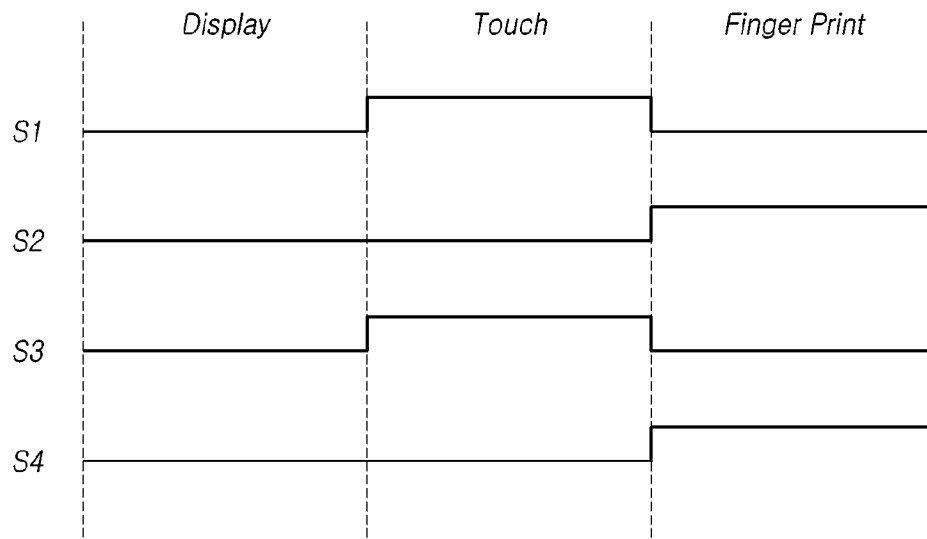

FIG. 3 is a diagram illustrating the structure of a driving circuit according to a first embodiment included in the touch display device 100.

Referring to FIG. 3, the driving circuit according to the first embodiment may include: a common electrode driving controller 131, which is connected with the common electrode 200 through a common voltage line and is configured to control driving of the common electrode 200; a pixel electrode driving controller 132, which is connected with the pixel electrode 300 through a data line (DL) and is configured to control driving of the pixel electrode 300; and a sensing unit 133 for sensing a change in the capacitance of the common electrode 200 or the pixel electrode 300 so as to sense a touch or the like on the display panel 110.

The common electrode driving controller 131 may include a first multiplexer (MUX1), an output end of the first multiplexer (MUX1) is connected with a common voltage line, and an input end of the first multiplexer (MUX1) may be connected with a common voltage (VCOM)-output end or the sensing unit 133.

The input end of the first multiplexer (MUX1) is connected with the common voltage (VCOM)-output end in a display-driving period, and outputs a common voltage (VCOM) to the common electrode 200.

The input end of the first multiplexer (MUX1) is connected with the sensing unit 133 in a first sensing period, which is a touch-sensing period, whereby the sensing unit 133 may sense a user touch using a change in the capacitance of the common electrode 200.

The pixel electrode driving controller 132 may include a second multiplexer (MUX2), an output end of the second multiplexer (MUX2) is connected with a data line (DL) and a third multiplexer (MUX3) of which an output end is connected with the second multiplexer (MUX2).

An input end of the second multiplexer (MUX2) is connected with the third multiplexer (MUX3) in the display-driving period and the first sensing period, and is connected with the sensing unit 133 in a second sensing period, which is a fingerprint-touch-sensing period.

An input end of the third multiplexer (MUX3) is connected with a data-voltage-output end in the display-driving period, and is connected with a load-free driving voltage (LFD)-output end in the first sensing period.

Therefore, the pixel electrode driving controller 132 may apply a data voltage to the pixel electrode 300 through the data line (DL) in the display-driving period, whereby an image is displayed. The pixel electrode driving controller 132 may apply a load-free driving voltage (LFD) to the pixel electrode 300 in the first sensing period, whereby the capacitance between the pixel electrode 300 and the common electrode 200 is prevented from affecting touch sensing.

The sensing unit 133 may include a fourth multiplexer (MUX4), and an input end of the fourth multiplexer (MUX4) is connected with the first multiplexer (MUX1) in the first sensing period, and is connected with the second multiplexer (MUX2) in the second sensing period.

The sensing unit 133 may be connected with the first multiplexer (MUX1) in the first sensing period, and may sense a change in the capacitance of the common electrode 200, thereby sensing a user touch.

The sensing unit 133 may be connected with the second multiplexer (MUX2) in the second sensing period, and may sense a change in the capacitance of the pixel electrode 300, thereby sensing a user fingerprint touch.

Therefore, the driving circuit of the first embodiment provides a single-driving-circuit structure, which is capable of performing display driving in the display-driving period, and is also capable of providing various sensing functions, such as touch sensing, fingerprint touch sensing, or the like in a sensing period distinguished from the display-driving period.

Each multiplexer included in the driving circuit is controlled by a signal (S1, S2, S3, and S4) applied to a corresponding multiplexer, and the timing diagram illustrated in FIG. 3 indicates the signal (0 or 1) applied in each period.

A configuration that matches a signal applied to each multiplexer and the input end of a multiplexer corresponding to the applied signal is as shown in Table 1 below.

TABLE 1

|   | S1 | S2 | S3 | S4 |
|---|---|---|---|---|
| 0 | VCOM | MUX3 | Display Data | MUX1 |
| 1 | MUX4 | MUX4 | LFD | MUX2 |

This provides an example in which the driving circuit according to the first embodiment operates, and the configuration may be set differently based on the signal applied to each multiplexer.

Hereinafter, the operation of the driving circuit according to the first embodiments in a display-driving period, a first sensing period, and a second sensing period will be described with reference to FIGS. 4 to 6.

Figure 4:
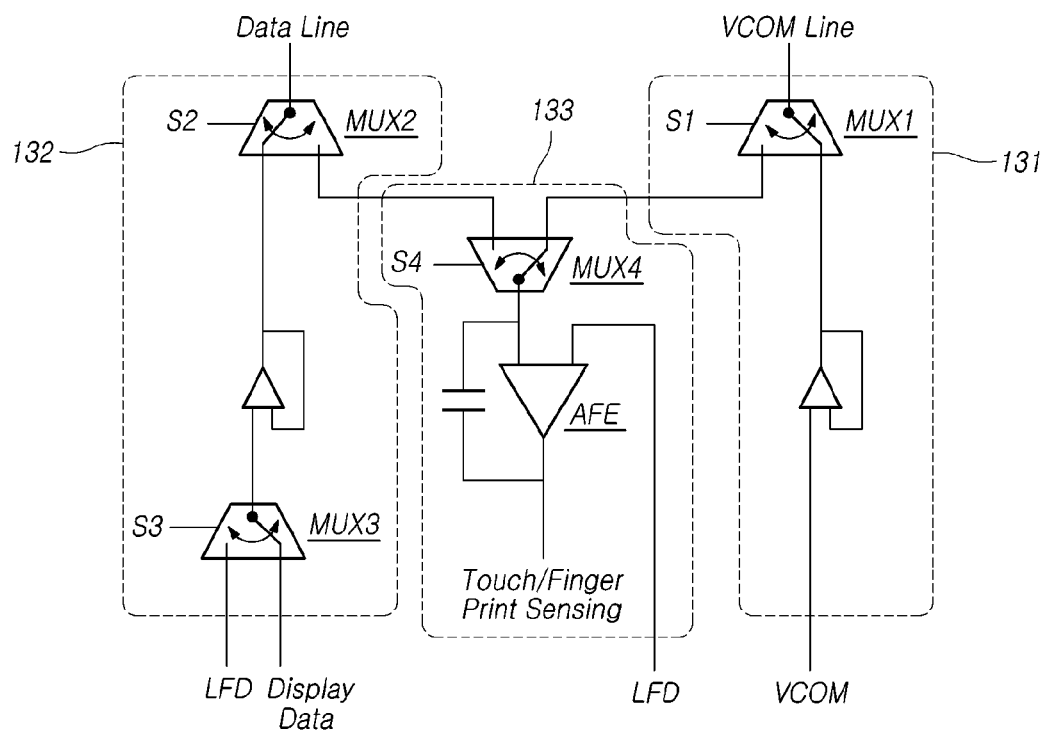
FIGS. 4 to 6 are diagrams illustrating the driving scheme of a driving circuit according to the first embodiment.
Figure 4:
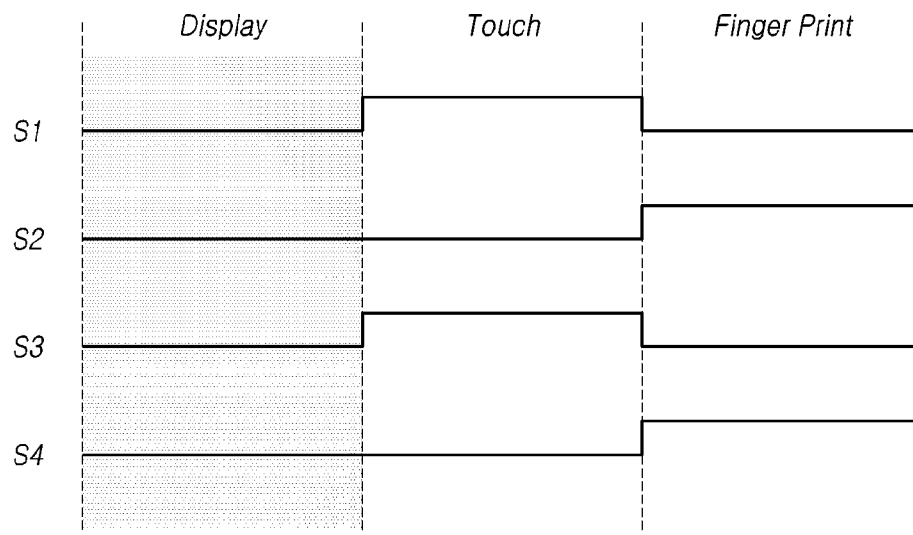

FIG. 4 illustrates the state in which the driving circuit according to the first embodiment operates in a display-driving period.

Referring to FIG. 4, in the display-driving period, all signals S1, S2, S3, and S4 applied to multiplexers are 0.

A signal applied to each multiplexer is 0, and thus, the first multiplexer (MUX1) is connected with the common voltage (VCOM)-output end, the second multiplexer (MUX2) is connected with the third multiplexer (MUX3), the third multiplexer (MUX3) is connected with a data-voltage-output end, and the fourth multiplexer (MUX4) is connected with the first multiplexer (MUX1) according to Table 1.

The input end of the first multiplexer (MUX1) is connected with the common voltage (VCOM)-output end, whereby a common voltage (VCOM) is applied to the common electrode 200.

The input end of the second multiplexer (MUX2) is connected with the third multiplexer (MUX3), and the input end of the third multiplexer (MUX3) is connected with the data-voltage-output end, whereby a data voltage is applied to the pixel electrode 300 through the data line (DL).

Therefore, the common voltage (VCOM) is applied to the common electrode 200 and the data voltage is applied to the pixel electrode 300, whereby the display panel 110 displays an image based on the data voltage.

The driving circuit according to the first embodiment may provide a function of sensing a touch on a display panel in a sensing period, which is distinguished from the display-driving period, in addition to a display-driving function.

Figure 5:
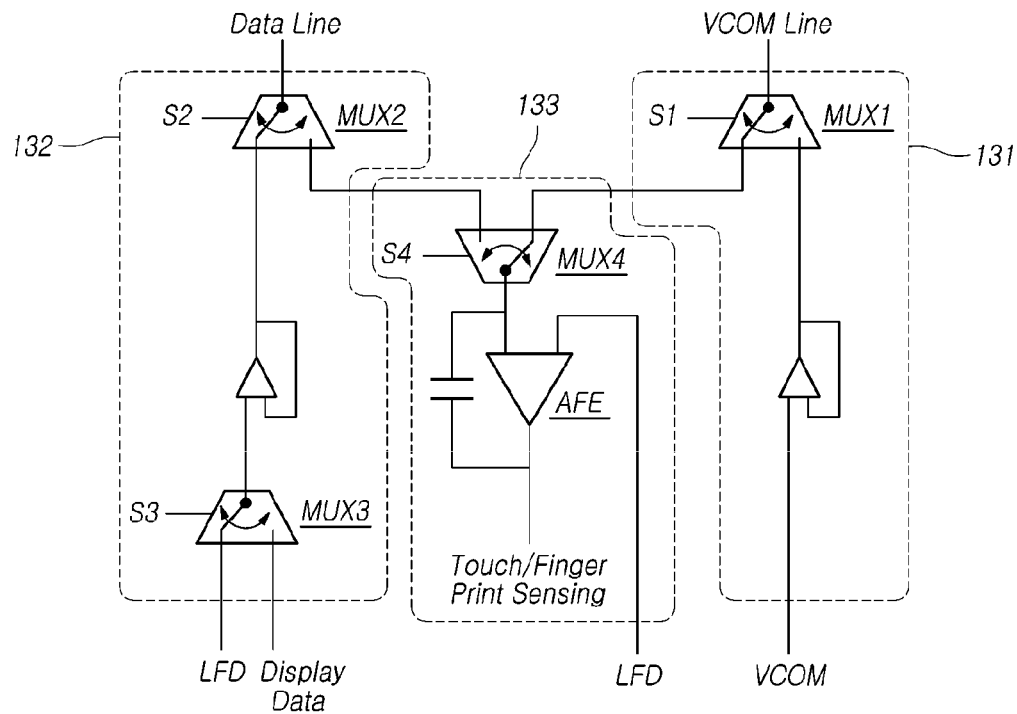
Figure 5:
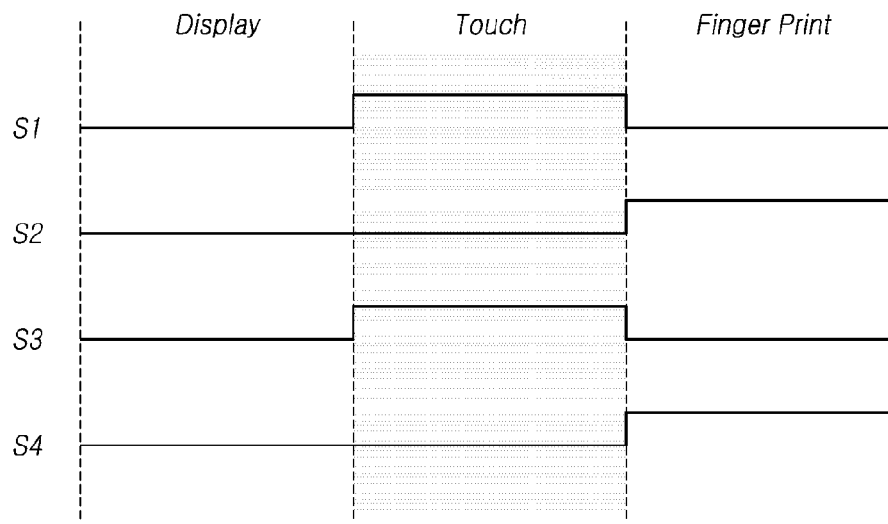

FIG. 5 illustrates the state in which the driving circuit according to the first embodiment operates in a first sensing period.

Referring to FIG. 5, in the first sensing period, signals applied to the second multiplexer (MUX2) and the fourth multiplexer (MUX4) remain at 0, and signals applied to the first multiplexer (MUX1) and the third multiplexer (MUX3) are changed to 1.

Since the applied signal S1 is changed to 1, the input end of the first multiplexer (MUX1) is connected with the fourth multiplexer (MUX4). Since the applied signal S3 is changed to 1, the input end of the third multiplexer (MUX3) is connected with the load-free driving voltage (LFD)-output end.

The input end of the first multiplexer (MUX1) is connected with the fourth multiplexer (MUX4), whereby the sensing unit 133 may sense a change in the capacitance of the common electrode 200.

The input end of the second multiplexer (MUX2) maintains the state of being connected with the third multiplexer (MUX3), and the input end of the third multiplexer (MUX3) is connected with the load-free driving voltage (LFD)-input end, whereby a load-free driving voltage (LFD) is applied to the pixel electrode 300.

A load-free driving voltage (LFD), which is the same as the voltage applied to the common electrode 200, is applied to the pixel electrode 300 in the first sensing period, whereby the capacitance between the pixel electrode 300 and the common electrode 200 may be prevented from affecting the change in the capacitance of the common electrode 200.

The driving circuit according to the first embodiment may perform display driving and touch sensing, and at the same time, enables additional sensing in addition to the touch sensing.

Figure 6:
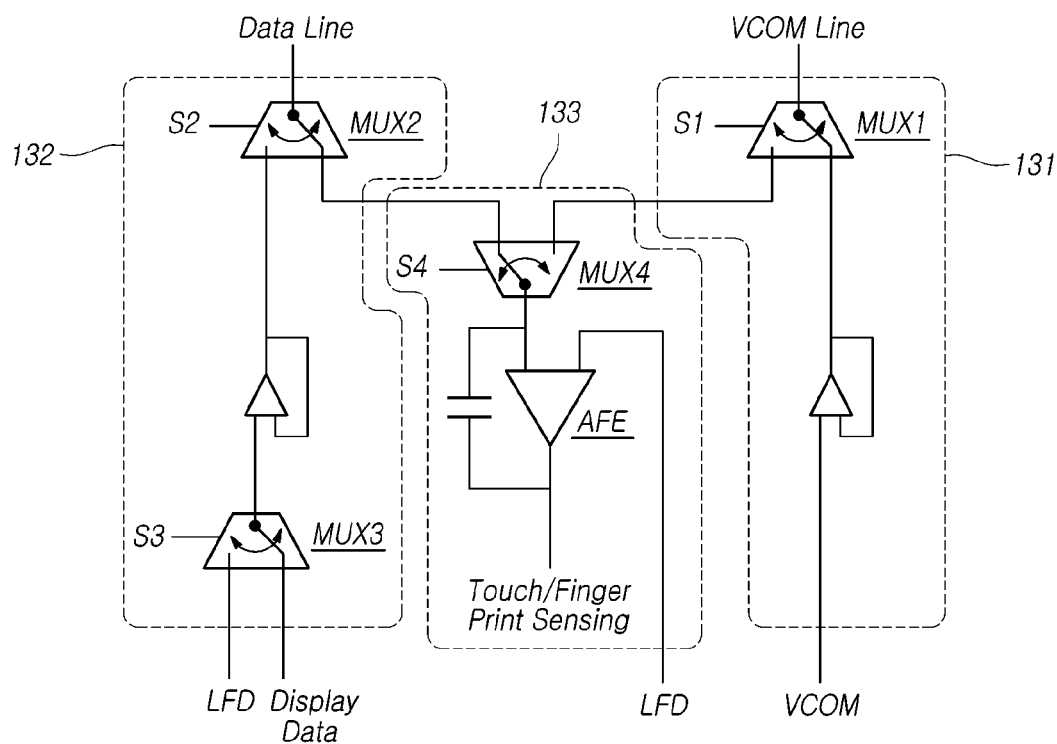
Figure 6:
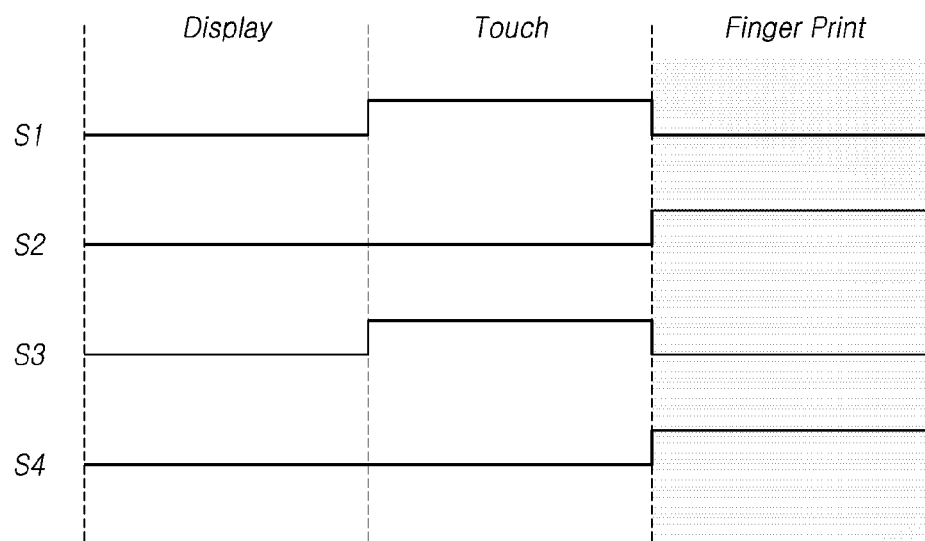

FIG. 6 illustrates the state in which the driving circuit according to the first embodiment performs additional sensing as well as touch sensing in a second sensing period.

Referring to FIG. 6, in the second sensing period, signal S1 applied to the first multiplexer (MUX1) is 0, signal S2 applied to the second multiplexer (MUX2) is 1, signal S3 applied to the third multiplexer (MUX3) is 0, and signal S4 applied to the fourth multiplexer (MUX4) is 1.

According to Table 1, the input end of the first multiplexer (MUX1) is connected with the common voltage (VCOM)-output end, the input end of the second multiplexer (MUX2) is connected with the fourth multiplexer (MUX4), the input end of the third multiplexer (MUX3) is connected with the data-voltage-output end, and the input end of the fourth multiplexer (MUX4) is connected with the second multiplexer (MUX2).

The second multiplexer (MUX2) connected with the data line (DL) is connected with the fourth multiplexer (MUX4) included in the sensing unit 133, whereby the sensing unit 133 may sense a change in the capacitance of the pixel electrode 300 through the data line (DL).

The sensing unit 133 senses a change in the capacitance of the pixel electrode 300, thereby performing additional sensing as well as touch sensing, using the change in the capacitance of the pixel electrode 300.

As an example, touch sensing is performed through the pixel electrode 300, which is smaller than the common electrode 200. Accordingly, differences in the capacitance between peaks and valleys of a fingerprint that is in contact with the display panel 110 may be sensed, and the separation of the peaks and valleys may be performed using the same. Thus, a fingerprint touch on the display panel 110 may be sensed.

Therefore, the driving circuit according to the first embodiment performs different types of sensing functions in the first sensing period and the second sensing period, which are distinguished from the display-driving period, whereby display driving, touch sensing, and fingerprint touch sensing are performed through a single driving circuit.

To sense a fingerprint touch in the second sensing period, peaks and valleys of a fingerprint need to be separated. Accordingly, it is necessary to sense a fine difference in the capacitance between a peak and a valley.

However, fingerprint touch sensing is performed using the pixel electrode 300, whereby voltage is also applied to the data line (DL) when voltage is applied to the pixel electrode 300. Accordingly, a change in the capacitance of the data line (DL) may affect the fingerprint touch sensing.

The touch display device 100 according to the embodiments of the present invention may provide the structure of a driving circuit and a driving scheme, which is capable of performing display driving, touch sensing, and fingerprint touch sensing through a single driving circuit, and may improve the accuracy of fingerprint touch sensing.

Figure 7:
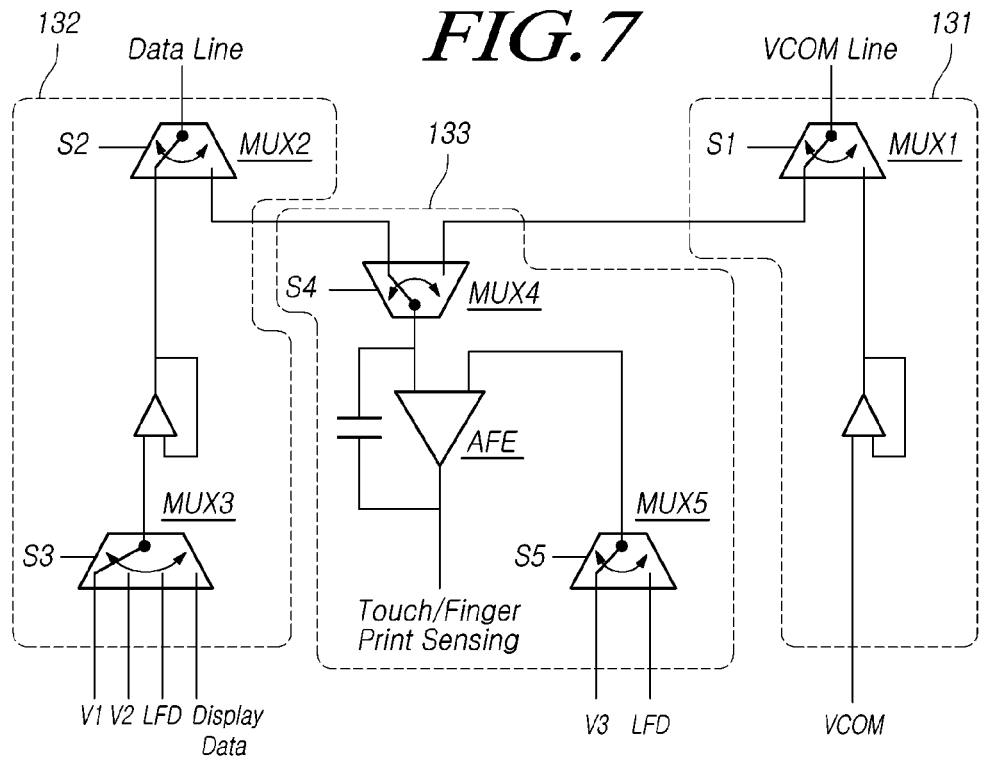
FIG. 7 is a diagram illustrating the structure of a driving circuit according to a second embodiment included in a touch display device.
Figure 7:
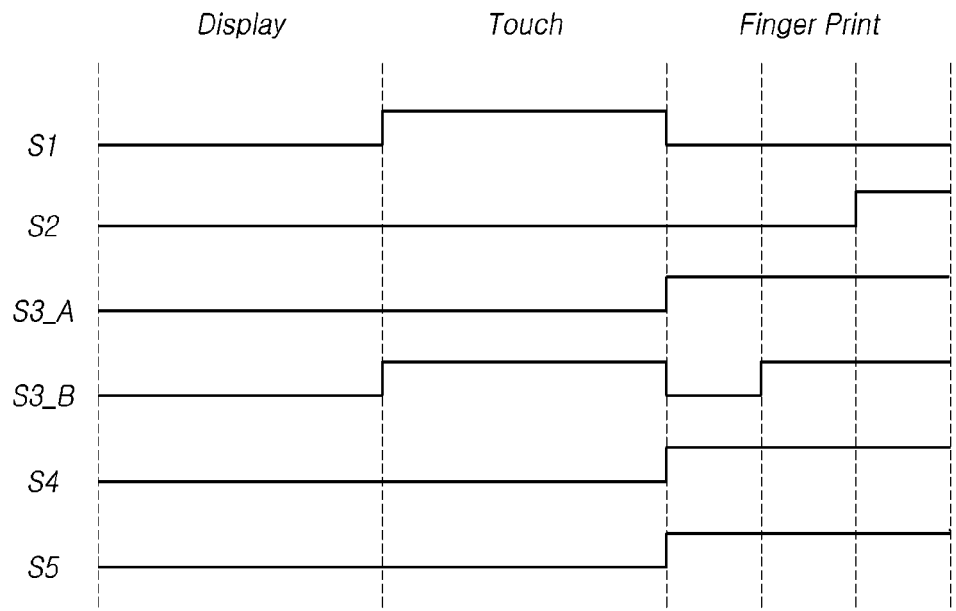

FIG. 7 is a diagram illustrating the structure of a driving circuit according to a second embodiment included in the touch display device 100.

Referring to FIG. 7, the driving circuit according to the second embodiment may include the common electrode driving controller 131, the pixel electrode driving controller 132, and the sensing unit 133. Herein, the structure of the driving circuit according to the second embodiment will be described emphasizing the differences from the driving circuit according to the first embodiment.

The driving circuit according to the second embodiment is a structure that can improve the accuracy of fingerprint touch sensing in a second sensing period, and this is obtained by improving the structure of the pixel electrode driving controller 132 and the sensing unit 133 related to fingerprint touch sensing, when compared with the driving circuit according to the first embodiment.

The pixel electrode driving controller 132 of the driving circuit according to the second embodiment includes a second multiplexer (MUX2) and a third multiplexer (MUX3). An input end of the third multiplexer (MUX3) is connected to a first voltage (V1)-output end, a second voltage (V2)-output end, a load-free driving voltage (LFD)-output end, or a data-voltage-output end.

Particularly, the input end of the third multiplexer (MUX3) is connected with the data-voltage-output end in a display-driving period, is connected with the load-free driving voltage (LFD)-output end in a first sensing period, and is connected with the first voltage (V1)-output end or the second voltage (V2)-output end in the second sensing period.

The sensing unit 133 includes a fourth multiplexer (MUX4) and a fifth multiplexer (MUX5). An output end of the fifth multiplexer (MUX5) is connected with a non-inverting (+) end of an operational amplifier and an output end of the fourth multiplexer (MUX4) is connected with an inverting (−) end of the operational amplifier.

An input end of the fifth multiplexer (MUX5) is connected with a load-free driving voltage (LFD)-output end or a third voltage (V3)-output end.

The signals S1, S2, S3_A, S3_B, S4, and S5, applied to respective multiplexers in the display-driving period, the first sensing period, and the second sensing period, are as illustrated in the timing diagram of FIG. 7.

The configuration that matches a signal applied to each multiplexer and a corresponding multiplexer is listed as shown in Table 2 and Table 3.

TABLE 2

|   | S1   | S2   | S4   | S5  |
|---|------|------|------|-----|
| 0 | VCOM | MUX3 | MUX1 | LFD |
| 1 | MUX4 | MUX4 | MUX2 | V3  |

TABLE 3

| S3_A | S3_B | |
|---|---|---|
| 0 | 0 | Display Data |
| 0 | 1 | LFD |
| 1 | 0 | V1 |
| 1 | 1 | V2 |

Table 2 illustrates the configuration that matches signals and the input ends of the first multiplexer (MUX1), the second multiplexer (MUX2), the fourth multiplexer (MUX4), and the fifth multiplexer (MUX5). Table 3 illustrates the configuration that matches signals and the input end of the third multiplexer (MUX3).

Hereinafter, the state in which the driving circuit according to the second embodiment operates in each period will be described with references to FIGS. 8 to 12. Here, the part that is the same as the operation state of the driving circuit according to the first embodiment will be briefly described.

Figure 8:
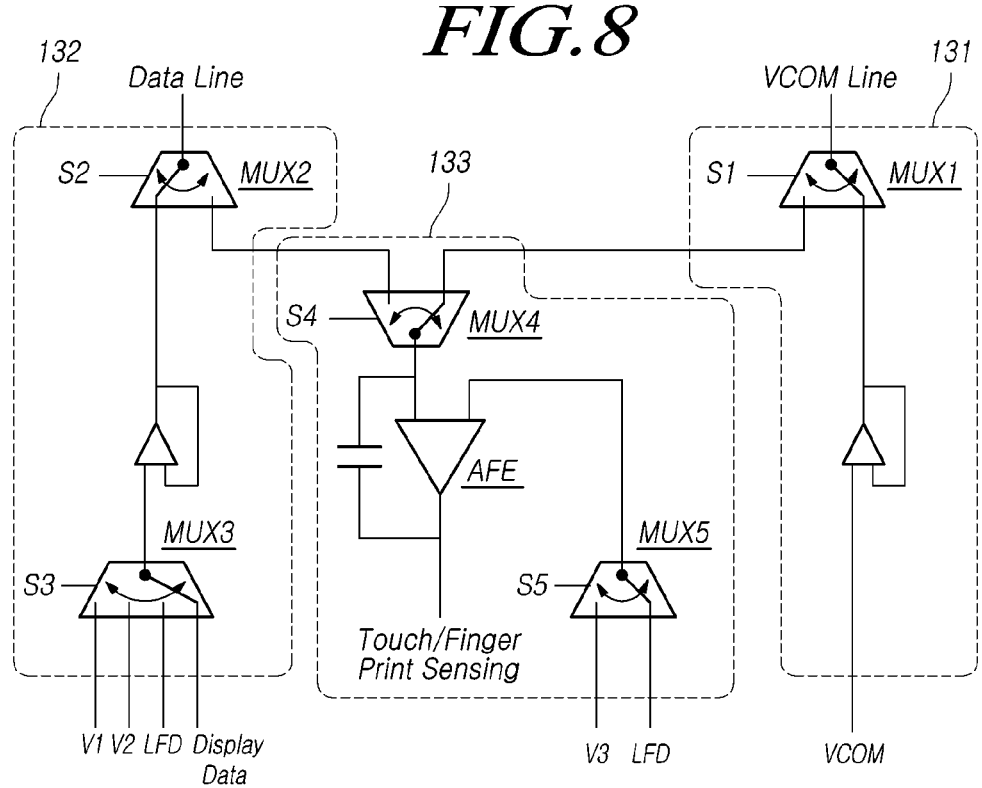
Figure 8:
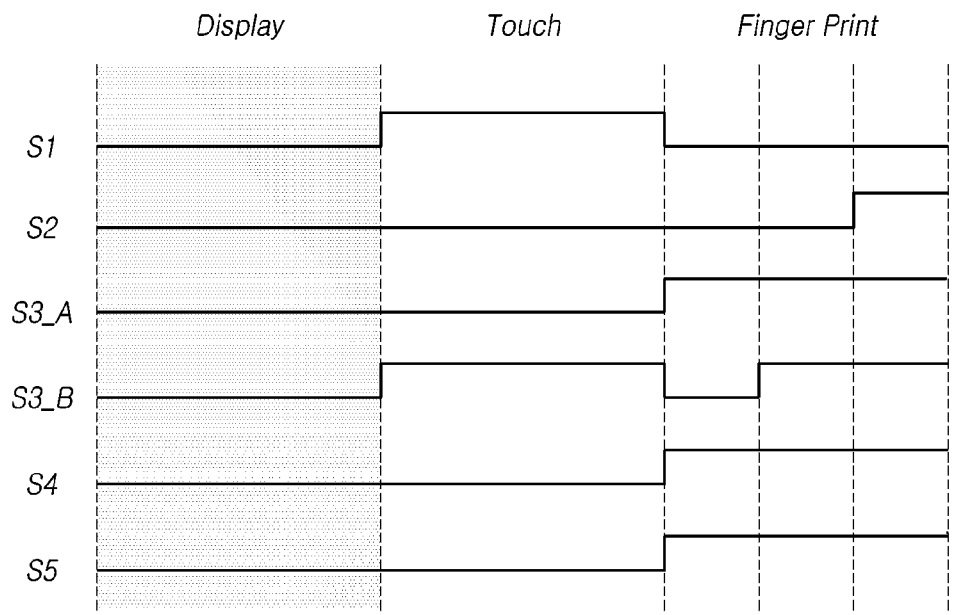

FIG. 8 illustrates the state in which the driving circuit according to the second embodiment operates in a display-driving period.

Referring to FIG. 8, the driving circuit according to the second embodiment performs control so that the data-voltage-output end is connected with the input end of the third multiplexer (MUX3) in the display-driving period, and performs control so that the load-free driving voltage (LFD)-output end is connected with the input end of the fifth multiplexer (MUX5).

Therefore, in the display-driving period, the driving circuit according to the second embodiment operates in the same manner as the driving circuit according to the first embodiment, and applies a common voltage (VCOM) to the common electrode 200 and applies a data voltage to the pixel electrode 300, whereby an image is displayed.

Figure 9:
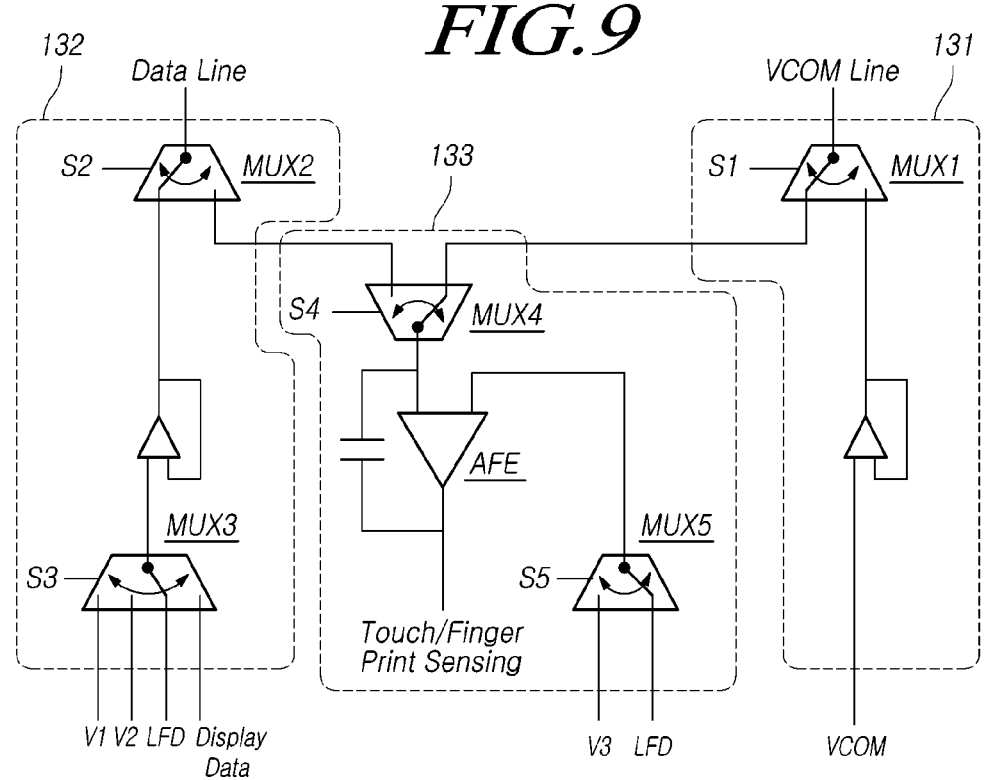
Figure 9:
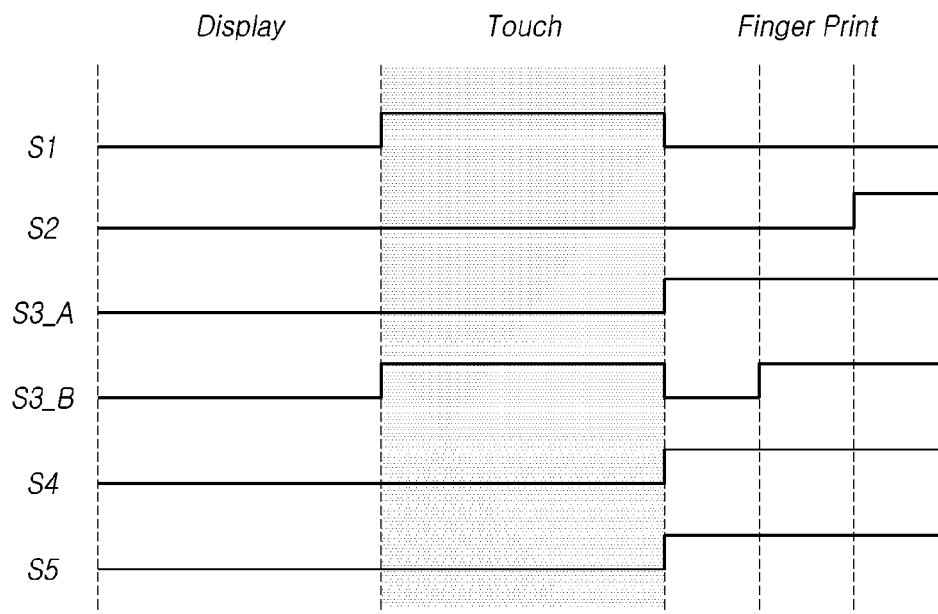

FIG. 9 illustrates the state in which the driving circuit according to the second embodiment operates in a first sensing period.

Referring to FIG. 9, in the first sensing period, the driving circuit according to the second embodiment may perform control so that the input end of the third multiplexer (MUx3) is connected with a load-free driving voltage (LFD)-output end, and may perform control so that the input end of the fifth multiplexer (MUX5) is connected with a load-free driving voltage (LFD)-output end.

Therefore, in the first sensing period, the driving circuit according to the second embodiment may operate in the same manner as the driving circuit according to the first embodiment, and the sensing unit 133 may sense a change in the capacitance of the common electrode 200, thereby sensing a user touch.

Figure 10:
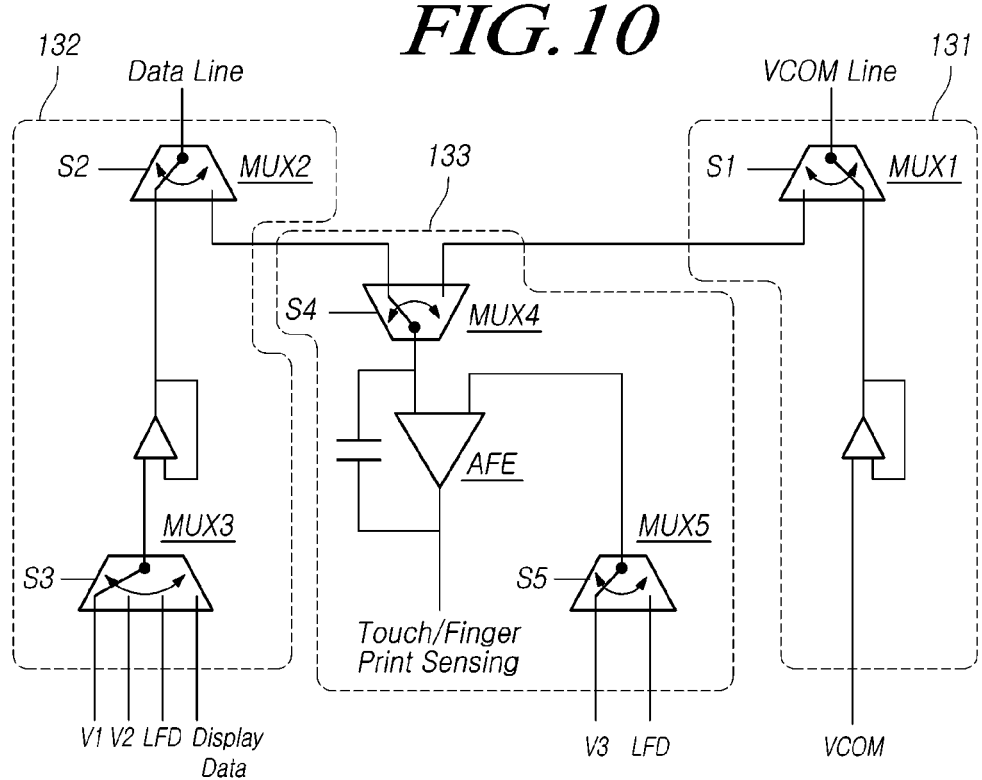
Figure 10:
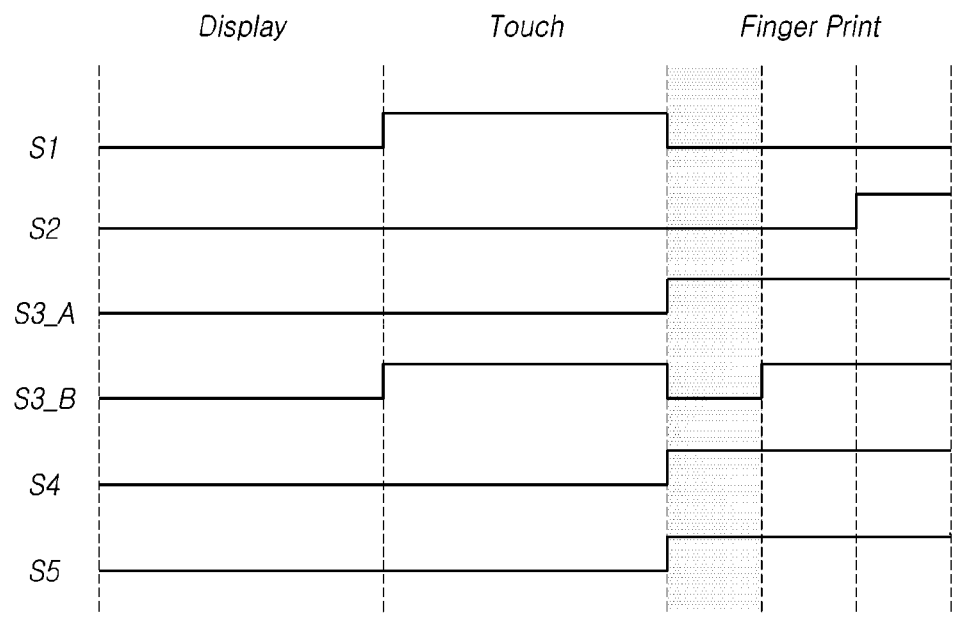
Figure 12:
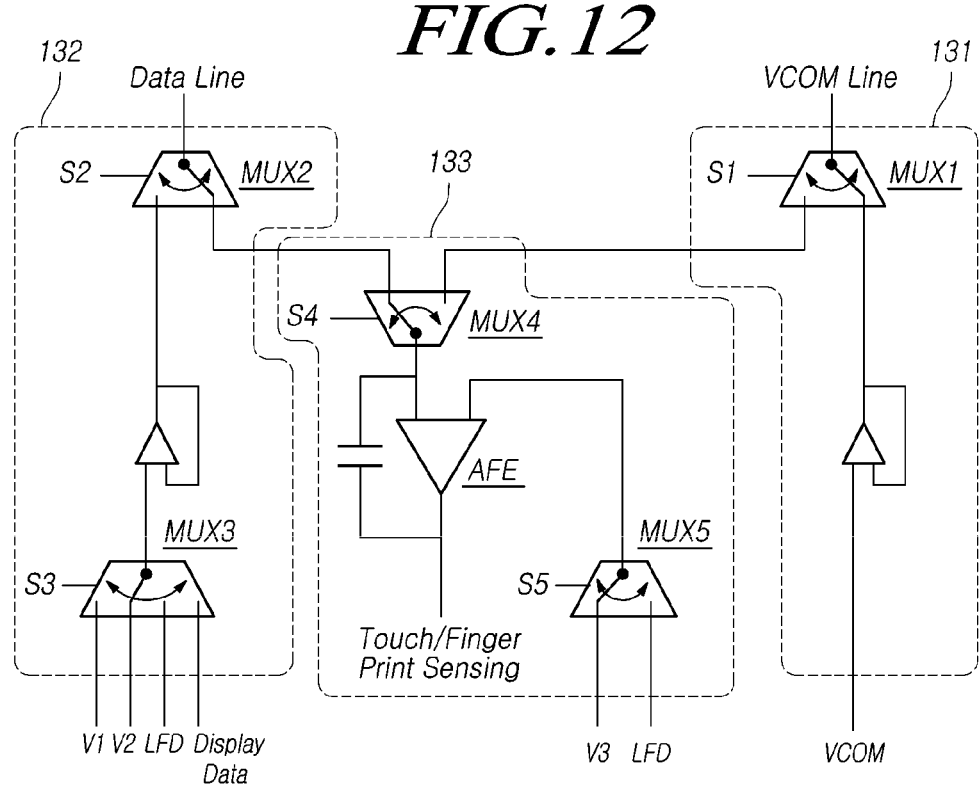
Figure 12:
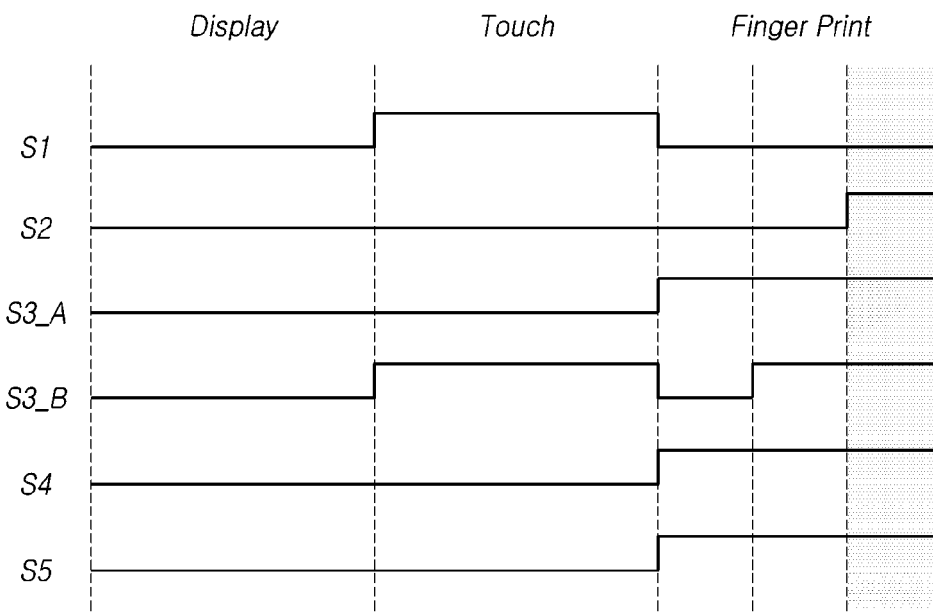

FIGS. 10 to 12 are diagrams illustrating the state in which the driving circuit according to the second embodiment operates in a second sensing period.

The driving circuit according to the second embodiment operates differently in a first interval, a second interval, and a third interval of the second sensing period. FIGS. 10 to 12 are diagrams illustrating operation states in the first interval, the second interval, and the third interval, respectively.

Referring to FIG. 10, in the first interval of the second sensing period, the input end of the first multiplexer (MUX1) is connected with the common voltage (VCOM)-output end, and the input end of the second multiplexer (MUX2) is connected with the third multiplexer (MUX3).

The input end of the third multiplexer (MUX3) is connected with the first voltage (V1)-output end, the input end of the fourth multiplexer (MUX4) is connected with the second multiplexer (MUX2), and the input end of the fifth multiplexer (MUX5) is connected with the third voltage (V3)-output end.

The input end of the first multiplexer (MUX1) is connected with the common voltage (VCOM)-output end, whereby a common voltage (VCOM) is applied to the common electrode 200.

The common voltage (VCOM) applied to the common electrode 200 in the second sensing period may act as a load-free driving voltage (LFD) for preventing the capacitance between the pixel electrode 300 and the common electrode 200 from affecting a change in the capacitance of the pixel electrode 300.

The input end of the second multiplexer (MUX2) is connected with the third multiplexer (MUX3) and the input end of the third multiplexer (MUX3) is connected with the first voltage (V1)-output end, whereby a first voltage (V1) is applied to the pixel electrode 300 through the data line (DL).

Since the first voltage (V1) is applied to the pixel electrode 300, a change in the capacitance of the pixel electrode 300 may be sensed when a touch is made on the display panel 110.

A first voltage (V1) is applied to the pixel electrode 300 through the data line (DL), whereby a change in the capacitance of the data line (DL) is sensed when a change in the capacitance of the pixel electrode 300 is sensed.

A capacitance-sensing value of the data line (DL) disturbs accurate sensing of a change in the capacitance of the pixel electrode 300, and thus the accuracy of fingerprint touch sensing is deteriorated, which is a drawback.

The driving circuit according to the second embodiment may remove the effect of the capacitance of the data line (DL) in the second interval of the second sensing period.

FIG. 11 is a diagram illustrating the state in which the driving circuit according to the second embodiment operates in the second sensing period.

Referring to FIG. 11, only a signal applied to the third multiplexer (MUX3) is changed by comparing a signal applied to each multiplexer in the second interval of the second sensing period with a signal applied in the first interval.

Accordingly, since the input end of the third multiplexer (MUX3) is connected with the second voltage (V2)-output end and the input end of the second multiplexer (MUX2) is connected with the third multiplexer (MUX3), a second voltage (V2) is applied to the data line (DL).

In this instance, in the second interval of the second sensing period, a switching transistor connecting the data line (DL) and the pixel electrode 300 is turned off and a second voltage (V2) is output to the data line (DL).

Since the second voltage (V2) is applied in the state in which the switching transistor connecting the data line (DL) and the pixel electrode 300 is turned off, the pixel electrode 300 maintains the state of the first voltage (v1) applied in the first interval, and only the data line (DL) is changed to the second voltage (V2).

That is, by fixing the data line (DL) to a predetermined voltage before sensing a change in the capacitance of the pixel electrode 300 in the second sensing period, a change in the capacitance of the data line (DL) is prevented from being transferred to the sensing unit 133.

A detailed description will be provided with reference to FIG. 12. FIG. 12 is a diagram illustrating the operation state of the driving circuit according to the second embodiment in the third interval of the second sensing period.

In the third interval of the second sensing period, only signal S2 applied to the second multiplexer (MUX2) is changed compared to a signal applied to each multiplexer in the third interval of the second sensing period.

Since the state of the second multiplexer (MUX2), which is connected with the third multiplexer (MUX3), is changed to the state of being connected with the fourth multiplexer (MUX4), variation in the capacitance of the pixel electrode 300 may be transferred to the sensing unit 133 through the data line (DL).

In this instance, the state of a switching transistor connecting the data line (DL) and the pixel electrode 300 is changed to the ON state in the third interval of the second sensing period.

When the switching transistor is turned on, the voltage of the pixel electrode 300 is changed to a second voltage (V2), which is the voltage of the data line (DL), and variation in the capacitance of the pixel electrode 300 may be transferred to the sensing unit 133 by the changed difference in voltage.

Since the data line (DL) is in the state of having the second voltage (V2), variation in the capacitance of the data line (DL), which is caused by the difference from the third voltage (V3) which is applied to the (+) end of the operational amplifier of the sensing unit 133, may be transferred to the sensing unit 133.

That is, by setting the second voltage (V2) applied to the data line (DL) to a voltage that is the same as the third voltage (V3) applied to the (+) end of the operational amplifier of the sensing unit 133 in the second interval of the second sensing period, variation in the capacitance of the data line (DL) may be prevented from being transferred to the sensing unit 133 in the third interval.

Therefore, only the variation in the capacitance of the pixel electrode 300 is transferred to the sensing unit 133 in the third interval of the second sensing period, whereby a sensing value attributable to a change in the capacitance of the data line (DL) may be prevented from being included in data from which the pixel electrode 300 senses a change in the capacitance.

The sensing unit 133 senses only the variation in the capacitance of the pixel electrode 300, whereby the separability of peaks and valleys in a fingerprint which is in contact with the display panel 110 may be improved and the accuracy of fingerprint touch sensing may be improved.

According to the present embodiments, the touch display device 100, which may perform display driving and touch sensing, is capable of performing additional sensing as well as touch sensing through a single driving circuit.

Display driving, touch sensing, fingerprint touch sensing, and the like are performed through a single driving circuit, whereby a separate driving circuit for a sensing function added to the touch display device 100 may not be needed.

Also, in the case of sensing a fingerprint touch using the pixel electrode 300, by adding a period in which only the voltage of the data line (DL) is fixed to be the same as a voltage applied to the (+) end of the operational amplifier of the sensing unit 133 between a period for applying voltage to the pixel electrode 300 and a period for sensing a change in the capacitance of the pixel electrode 300, the effect of the capacitance of the data line (DL) may be removed and the accuracy of fingerprint touch sensing may be improved.

Although various embodiments have been described for illustrative purposes, those skilled in the art will appreciate that various modifications, additions and substitutions are possible, without departing from the scope and spirit of the invention as disclosed in the accompanying claims. Therefore, exemplary embodiments of the present invention have been described for the sake of brevity and clarity. The scope of the present invention shall be construed on the basis of the accompanying claims in such a manner that all of the technical ideas included within the scope equivalent to the claims belong to the present invention.

What is claimed is:

1. A sensing unit of a driving circuit, comprising:
    an operational amplifier;
    a sensing control multiplexer, an output end of the sensing control multiplexer being connected with an inverting end of the operational amplifier, and an input end of the sensing control multiplexer being connected with a common voltage line during a first sensing period and connected to a data line during a part of a second sensing period, the common voltage line connected to a common electrode, and the data line connected to a pixel electrode; and
    a voltage control multiplexer, an output end of the voltage control multiplexer being connected with a non-inverting end of the operational amplifier, and an input end of the voltage control multiplexer being connected to a load-free driving voltage-output end which outputs a load-free driving voltage during the first sensing period, and being connected to a reference voltage-output end which outputs a reference voltage which is different from the load-free driving voltage during the second sensing period.

2. The sensing unit of claim 1, wherein the sensing control multiplexer is connected to the data line during a third interval after a first interval and a second interval in the second sensing period,
    wherein a first voltage is applied to the data line during the first interval in a state in which a switching transistor, which connects the data line and the pixel electrode, is turned on, and a second voltage is applied to the data line during the second interval in a state in which the switching transistor is turned off.

3. The sensing unit of claim 2, wherein the second voltage applied in the second interval of the second sensing period is the same voltage as a reference voltage.

4. A driving circuit, comprising:
    a common electrode driving controller connected to a common electrode, disposed inside a display panel, through a common voltage line, the common electrode driving controller configured to apply a common voltage to the common electrode during a display-driving period;
    a pixel electrode driving controller connected to a pixel electrode, disposed inside the display panel, through a data line, the pixel electrode driving controller configured to apply a data voltage to the pixel electrode during the display-driving period; and
    a sensing unit being connected to the common electrode driving controller and configured to sense a change in capacitance between the common electrode and an object that is in contact with the display panel during a first sensing period, and the sensing unit being connected to the pixel electrode driving controller and configured to sense a change in capacitance between the pixel electrode and an object that is in contact with the display panel during a second sensing period.

5. The driving circuit of claim 4, wherein the common electrode driving controller comprises a first multiplexer, an output end of the first multiplexer is connected to the common voltage line,
    wherein an input end of the first multiplexer is connected to a common voltage-output end during the display-driving period and the second sensing period, and is connected to the sensing unit during the first sensing period.

6. The driving circuit of claim 5, wherein the pixel electrode driving controller comprises:
   a second multiplexer, an output end of the second multiplexer being connected to the data line; and
   a third multiplexer, an output end of the third multiplexer being connected to the second multiplexer,
   wherein an input end of the second multiplexer is connected to the third multiplexer during the display-driving period and the first sensing period and is connected to the sensing unit during the second sensing period; and
   an input end of the third multiplexer is connected to a data-voltage-output end during the display-driving period and is connected to a load-free driving voltage-output end during the first sensing period.

7. The driving circuit of claim 6, wherein the sensing unit comprises a fourth multiplexer,
   wherein an input end of the fourth multiplexer is connected to the first multiplexer during the first sensing period and is connected to the second multiplexer during the second sensing period.

8. The driving circuit of claim 5, wherein the pixel electrode driving controller comprises:
   a second multiplexer, an output end of the second multiplexer being connected to the data line; and
   a third multiplexer, an output end of the third multiplexer being connected to the second multiplexer,
   wherein an input end of the second multiplexer is connected to the third multiplexer during the display-driving period and the first sensing period, is connected to the third multiplexer during a first interval and a second interval of the second sensing period, and is connected to the sensing unit during a third interval of the second sensing period; and
   an input end of the third multiplexer is connected to a data-voltage-output end during the display-driving period, is connected to a load-free driving voltage-output end during the first sensing period, is connected to a first-voltage-output end during the first interval of the second sensing period, and is connected to a second-voltage-output end during the second interval of the second sensing period.

9. The driving circuit of claim 8, wherein the sensing unit comprises:
   a fourth multiplexer, an output end of the fourth multiplexer being connected to an inverting end of an operational amplifier; and
   a fifth multiplexer, an output end of the fourth multiplexer being connected with a non-inverting end of the operational amplifier,
   wherein an input end of the fourth multiplexer is connected to the first multiplexer during the first sensing period and is connected to the second multiplexer during the third interval of the second sensing period; and
   an input end of the fifth multiplexer is connected to the load-free driving voltage-output end during the first sensing period and is connected to a third voltage-output end during the second sensing period.

10. The driving circuit of claim 9, wherein the second voltage applied in the second interval of the second sensing period is the same voltage as the third voltage.

11. The driving circuit of claim 8, wherein a first voltage is applied in a state in which a switching transistor that connects the data line and the pixel electrode is turned on, and a second voltage is applied in a state in which the switching transistor is turned off.

12. The driving circuit of claim 4, wherein the pixel electrode driving controller applies a load-free driving voltage to the data line during the first sensing period.

* * * * *